United States Patent [19]

Volk, Jr. et al.

[11] Patent Number: 5,257,725
[45] Date of Patent: Nov. 2, 1993

[54] BULK BAG SUPPORT FRAMEWORK

[75] Inventors: Joseph A. Volk, Jr., Creve Coeur, Mo.; Thomas B. Heath, Northport; James B. Hickman, Carrollton, both of Ala.

[73] Assignee: Beta Raven Inc., Earth City, Mo.

[21] Appl. No.: 698,307

[22] Filed: May 10, 1991

Related U.S. Application Data

[63] Continuation-in-part of Ser. No. 629,157, Dec. 18, 1990, Pat. No. 5,141,135.

[51] Int. Cl.$^5$ .............................................. B67D 5/06
[52] U.S. Cl. ..................... 222/185; 222/203; 414/608
[58] Field of Search .................. 222/203, 181, 185, 1; 211/187, 207; 414/403, 607, 608

[56] References Cited

U.S. PATENT DOCUMENTS

| | | | |
|---|---|---|---|
| 4,194,652 | 3/1980 | Williamson et al. | 222/530 X |
| 4,810,156 | 3/1989 | Pendleton et al. | 222/203 X |
| 4,966,311 | 10/1990 | Taylor | 414/403 X |
| 5,069,596 | 12/1991 | Mueller et al. | 414/608 X |

FOREIGN PATENT DOCUMENTS 109191 5/1984 European Pat. Off. ............ 414/608

Primary Examiner—Gregory L. Huson
Attorney, Agent, or Firm—Rogers, Howell & Haferkamp

[57] ABSTRACT

A supporting framework for a soft-sided bulk bag containing a quantity of bulk dry material, the bag having four loop-type straps positioned at the corners of its top, includes a bird cage-like framework with four hook members for securing the bag straps thereto and a pair of U-shaped rails for receiving the blades of a forklift truck. The bird cage-like structure fits over the top of the bulk bag so that the bulk bag may be secured thereto and the framework and bag subsequently lifted and handled from its top instead of its bottom as in the prior art. Additionally, a generally horizontally extending bracket lip surrounds the bird cage-like framework to facilitate its being lifted and set down into place on a batch weighing apparatus or the like for controlled dispensing of the bulk dry material through a pour spout located in the bottom of the bag.

5 Claims, 2 Drawing Sheets

BULK BAG SUPPORT FRAMEWORK

CROSS-REFERENCE TO RELATED APPLICATIONS

This is a continuation-in-part of Ser. No. 07/629,157 filed Dec. 18, 1990, now U.S. Pat. No. 5,141,135.

BACKGROUND AND SUMMARY OF THE INVENTION

In the prior art, bulk dry material was typically shipped in many different kinds of containers and then those containers were discarded after the bulk material was received by the end user and loaded into other bulk storage facilities including bins or the like. For many reasons, including cost, soft-sided, high strength, multiple layer bags have been recently developed and are gaining in popularity for the shipment and handling of significant quantities of bulk dry material. The inventor herein is aware of uses in the food industry where the dry material contained in the bag typically approaches 3,000 lbs., with a bag standing 3–4 feet in height with a square base between 2–3 feet on a side. For shipment, these bulk bags are typically skid mounted so that a forklift may conveniently be used to handle the bag by lifting the skid and moving the bag as desired. Strap-like lifting handles are typically provided at the four corners at the top of the bag, but the inventor is unaware of any use for these handles other than to facilitate grasping of the bag by several men for manually adjusting the position of the bag on the skid or the floor. These lifting straps are sufficiently sturdy to permit lifting of the bag and its contents thereby, and it is presumed by the inventor that overhead cranes or the like may be used in some installations for transporting the bags and/or contents within a plant or other facility.

Typically, at least in one application, these bulk bags have a pour spout integrally formed therein and located near the center bottom of the bag such that the bag may be positioned off the floor and on some type of weighing, batching, or mixing apparatus for dispensing of the dry material directly from the bulk bag. For these applications, it is typically required to lift the bulk bag and its contents from the floor or other storage facility, up and onto the particular piece of equipment being utilized to dispense the dry material. For these applications, it is particularly difficult for a forklift truck to lift the bulk bag and put it in place on the machine. Typically, as might be expected, the underlying skid cannot be used as it would block the bottom pour spout of the bag. Therefore, as best known to the inventor, the forklift operator typically scoops the bulk bag off the skid by placing the forklift blade beneath the bulk bag and the skid. This involves considerable risk of tearing of the bag or otherwise damaging the bag and thereby ruining it for its intended purpose. Additionally, these bulk bags can be quite unsafe when lifted to any appreciable height as the bag typically leans to one side and is unsteady, and the contents thereof may readily shift as the bag is lifted. Furthermore, movement of the bag tends to cause the contents to shift in an unpredictable manner such that the bag is not strictly aligned. For some equipment, this makes it difficult for a forklift truck operator to place the bag properly as limited space may be provided therefore in the equipment.

In order to solve these and other problems in the prior art and in order to facilitate the support and lifting of the soft-sided bulk bags by forklift trucks, the inventor herein has succeeded in designing and developing a bird cage-like framework which may be set over the top of a bulk bag to surround it, with the framework having four hook-like strap supports located at its corners to which the bulk bag's straps may be affixed. Additionally, a pair of rails comprised of inverted U-brackets extend along the top of the framework from the front to back thereof to provide a convenient structure to receive the blades of a forklift truck so that the framework may be conveniently handled thereby. Additionally, a bracket lip may be formed by a set of horizontally extending brackets surrounding the outside of the framework and immediately above the ground such that the framework may be lifted and placed onto a receiving bracket lip mounted to the user's equipment so that the framework may be used not only to support and lift the bulk bag and its contents, but also to mount it to a bulk storage and dispensing machine such as a batch weighing apparatus or the like.

As can be appreciated, many of the problems in the prior art have been solved by the present invention. For example, the forklift blades need not be shoved between the bottom of the bag and the skid which thereby eliminates risk of damage to the bottom of the bag and pour spout. As the bag is lifted by handling the framework, minimal physical contact is made with the bag which further reduces accidental tearing, or other damage to the bag caused by shifting of the contents thereof. Lifting the framework from the top causes the bag to "sag" and forces the straps to support the bag relatively evenly to thereby facilitate placement of the bag and framework on a user's piece of equipment. By placing the bag on a skid whose dimensions are smaller than the framework, the bag may be easily secured to the framework, lifted off the skid, and thus be suspended off the ground by the framework for easy placement on other equipment. Furthermore, the outer dimensions of the framework define an envelope required on the equipment for placement of the bag and which the user may rely on from bag to bag regardless of the shifting contents thereof or tilting of the bag on the forklift as is experienced in the prior art.

While the principal advantages and features of the present invention have been described above, a more complete understanding thereof may be attained by referring to the drawings and description of the preferred embodiment which follow.

DETAILED DESCRIPTION OF THE PREFERRED EMBODIMENT

Figure 1:
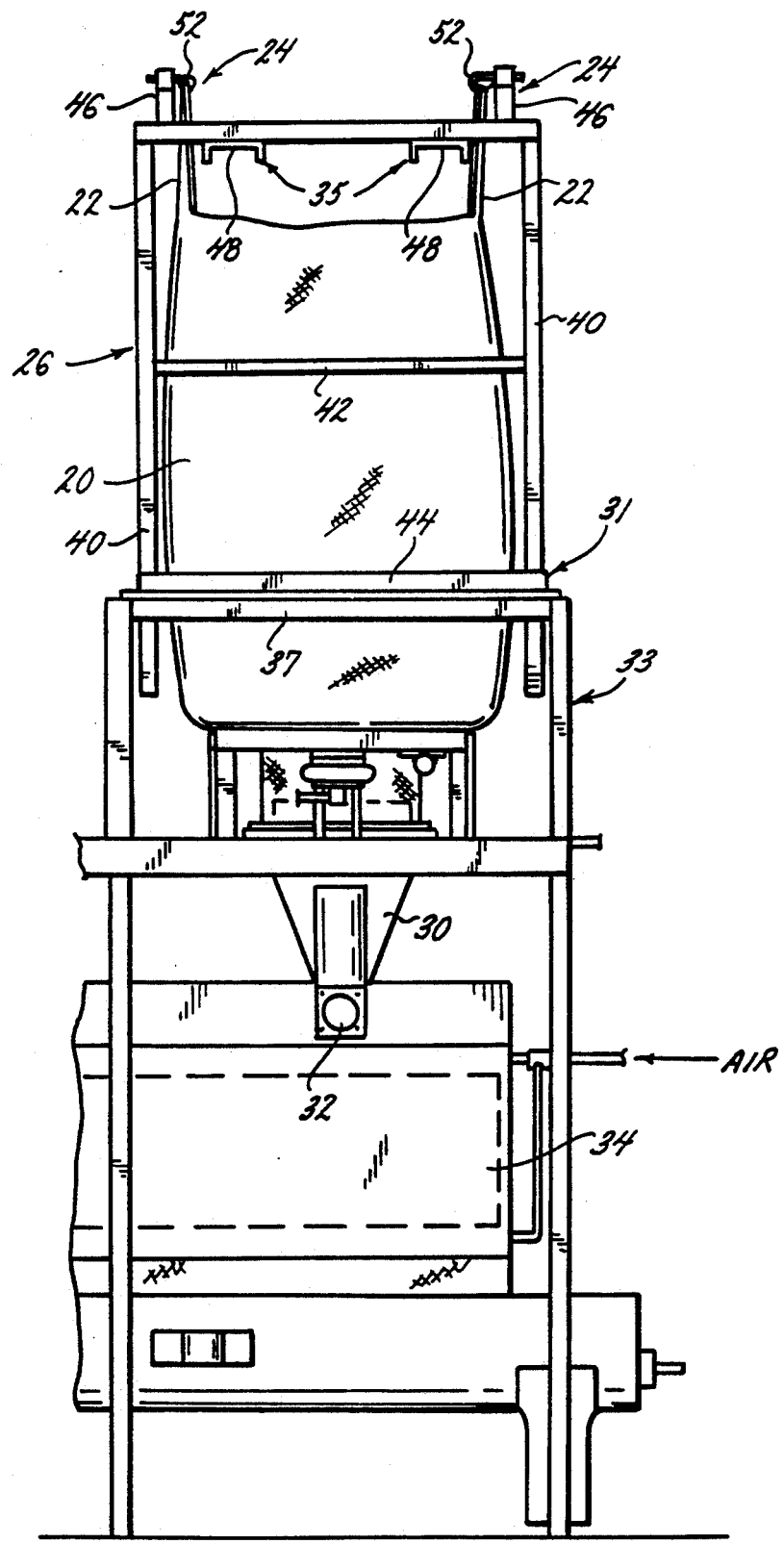
FIG. 1 is a partial front view of a typical batch weighing machine which has been adapted for receiving the bulk bag framework of the present invention.

As shown in FIG. 1, a bulk bag 20 may be supported by its plurality of loop-type straps 22 which are looped into hook members 24 to thereby support the bulk bag 20 from the support framework 26 of the present invention. A bracket lip 31 extending generally horizontally around the framework 26 permits the framework 26 to be rested directly on a bulk weighing apparatus 33 or the like as shown therein for directly dispensing the bulk dry material contained within bulk bag 20 through a pour spout (not shown) and into a trough 30 with an auger 32 connected thereto for measuring the dry material into a weigh trough 34. Also included on the framework 26 are a pair of lifting rails 35 which extend above the top of the bag 20 and from near the front of the framework 26 to the rear thereof to provide a convenient place for lifting of the framework 26 by the blades of a forklift truck (not shown). Thus, the bulk bag 20 may be lifted off the floor and placed into position on the bulk weighing apparatus 33 in a convenient manner and without interference with other supporting apparatus. The framework 26 is merely lowered down into place where bracket lip 31 contacts a corresponding supporting member 37 on batch weighing apparatus 33 to thereby support bulk bag 20 and its contents as well as the framework 26.

Figure 2:
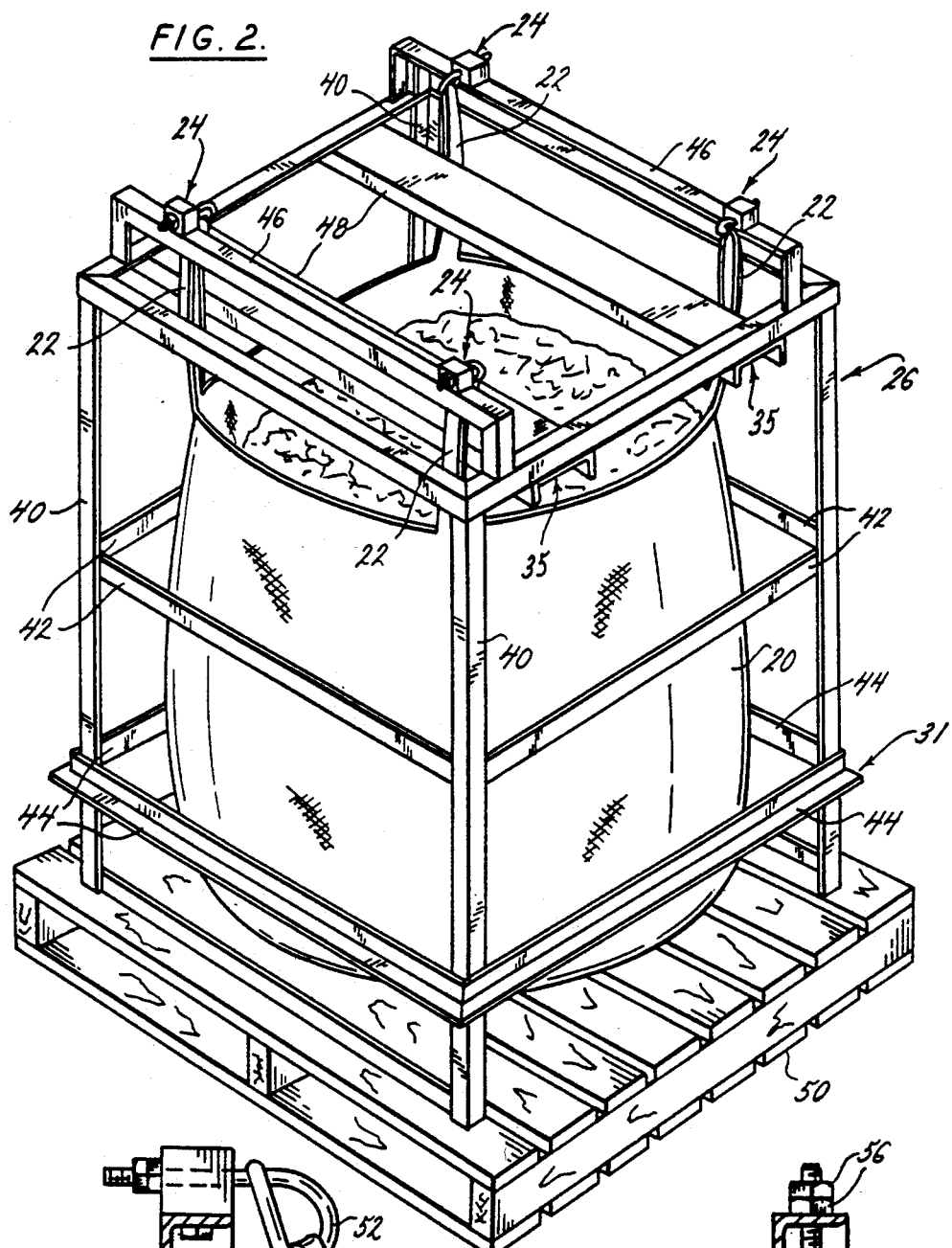
FIG. 2 is a perspective view of a skid mounted bulk bag with the framework of the present invention installed over the bag and attached thereto.
Figure 3:
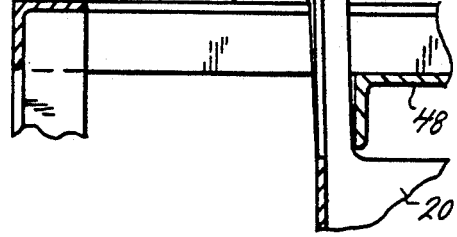
FIG. 3 is a partial cross-sectional view taken along the plane of line 3—3 in FIG. 2 and detailing the hook member used to secure the bag straps to the framework.
Figure 4:
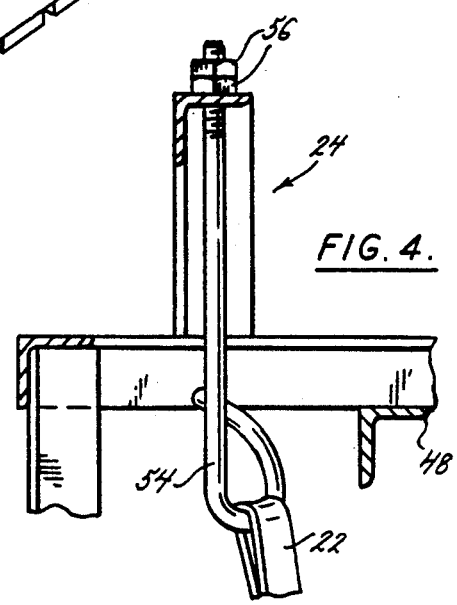
FIG. 4 is a partial cross-sectional view detailing an alternate embodiment for the framework hook members.

As shown in FIGS. 2-4, the supporting framework 26 includes four vertically oriented, upstanding posts 40 located at the four corners of the framework 26, said posts 40 being interconnected and supported by a plurality of generally horizontally extending bracket members 42. Additionally, a generally horizontally extending bracket lip 31 is comprised of a plurality of generally L-shaped bracket members 44 which also extend between and interconnect posts 40, except that they are on the outside thereof. At the top of supporting framework 26, a pair of upper bracket rails 46 extend from near the front of the framework 26 to the rear thereof and provide the mounting locations for four hook members 24 which are pivotally secured thereto. Hook members 24 are shown in greater detail in FIGS. 3 and 4. A pair of generally U-shaped rails 48 also extend from near the front of the framework 26 to the rear thereof and provide a convenient structure for receiving the blades of a forklift truck (not shown) which may be used to lift the framework 26 and bag as a unit. The loop-type straps 22 are all secured to the framework 26 by being looped into the hook members 24 which provides the sole attachment between framework 26 and bag 20. Thus, as the framework 26 is lifted, the bag 20 and its contents settle uniformly between the posts 40 of framework 26. Bag 20 is shown in FIG. 2 as resting on a skid 50 which is typically how bulk bags 20 are shipped. Thus, framework 26 may be conveniently lifted over the top of the bulk bag 20 and the straps 22 secured to hook members 24 quickly and conveniently to secure them together.

Although the framework 26 is depicted in FIG. 2 as resting directly on skid 50, skid 50 is typically smaller than shown therein such that the framework 26 rests instead on the floor. With this arrangement, it is much more convenient to attach the loop-type straps 22 to the hook members 24 as the hook members 24 may be loosened to a greater degree. After the bag 20 is secured to the framework 26, the framework 26 and bag 20 may then be lifted from off the skid and the framework replaced on the floor such that the bag 20 is supported above the floor. Thus, after the bag 20 has been secured to the framework 26 it is totally enclosed within the envelope defined by the framework 26, including the lower surface thereof. This makes it much more convenient for placing of the bag 20 and framework 26 on a piece of equipment. Also, the framework 26 may thus be used to store the bag 20 and its contents above floor level without being directly in contact with the floor along its lower surface as when the bag 20 is supported by the skid 50.

As shown in FIG. 3 and 4, two different variations of hook member 24 may be provided. As shown in FIG. 3, hook member 24 comprises a somewhat shorter and generally horizontally extending hook 52 which is pivotally attached such that the hook 52 may be rotated to assist in securing the strap 22 thereto. Alternately, as shown in FIG. 4, a generally vertically extending hook 54 may be provided which may be first looped through the strap 22 and then secured in a fixed orientation in a double-nut configuration 56. Generally, the inventor has experienced better results with the embodiment shown in FIG. 3, although both embodiments will work.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A free standing framework for supporting and lifting a soft-sided bag from the top thereof and supporting said framework and bag on a device for dispensing the contents of said bag, said framework having means for supporting the framework from said dispensing device, means for attaching to the top of said bag, means positioned near the top of said bag for lifting said framework so that said bag is supported from said bag attaching means as said bag and framework is lifted off of said dispensing device, and said means for supporting comprising a bracket lip secured to and extending around at least a portion of the exterior of said framework for supporting said framework and bag on said bag dispensing device.

2. The framework of claim 1 wherein said lifting means comprises a pair of lifting rails, said rails having a generally U-shaped cross-sectional shape and extending substantially from one side of said framework to the opposite side of said framework, said lifting rails being particularly adapted for receiving the forks of a forklift truck.

3. The framework of claim 1 wherein said attaching means comprises a plurality of pivotally mounted hook members, said bag having a plurality of loop-type lifting straps secured near its top, said hook members being adapted to receive said lifting straps.

4. The framework of claim 1 wherein said framework comprises a free-standing bird cage-like assembly, said assembly including a plurality of generally vertically oriented posts, a plurality of generally horizontally oriented braces interconnecting said posts, and said bracket lip surrounds said bird cage-like assembly.

5. The framework of claim 4 wherein said bracket lip comprises a bracket extending substantially horizontally around the outside of said framework and spaced above the bottom thereof.

* * * * *